Aug. 23, 1955     W. M. PATTERSON     2,715,909
STORAGE TANK VENT VALVE
Filed Dec. 4, 1951     3 Sheets-Sheet 1
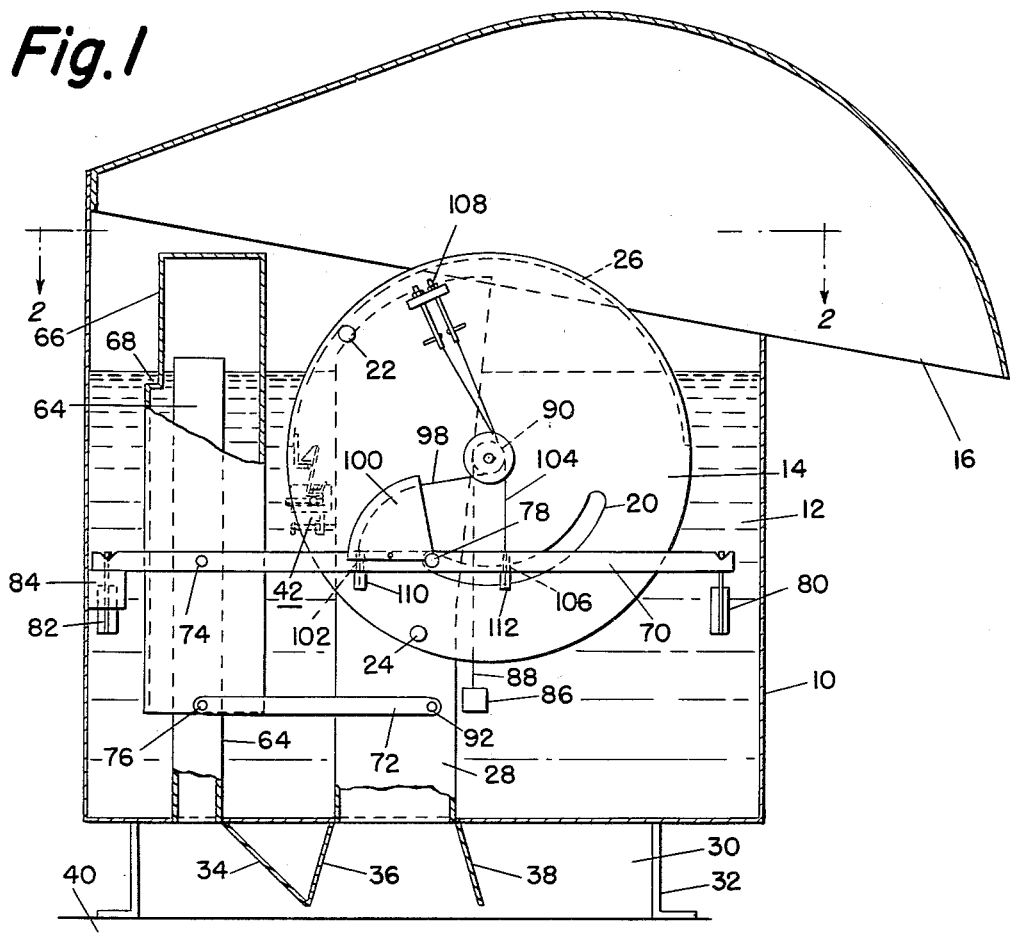
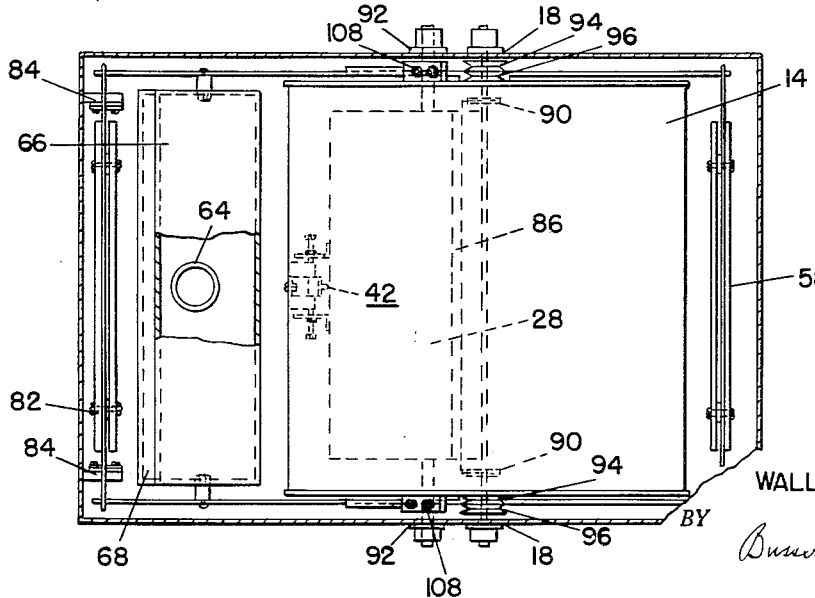
INVENTOR.
WALLACE M. PATTERSON
BY
*Busser and Smith*
ATTORNEYS

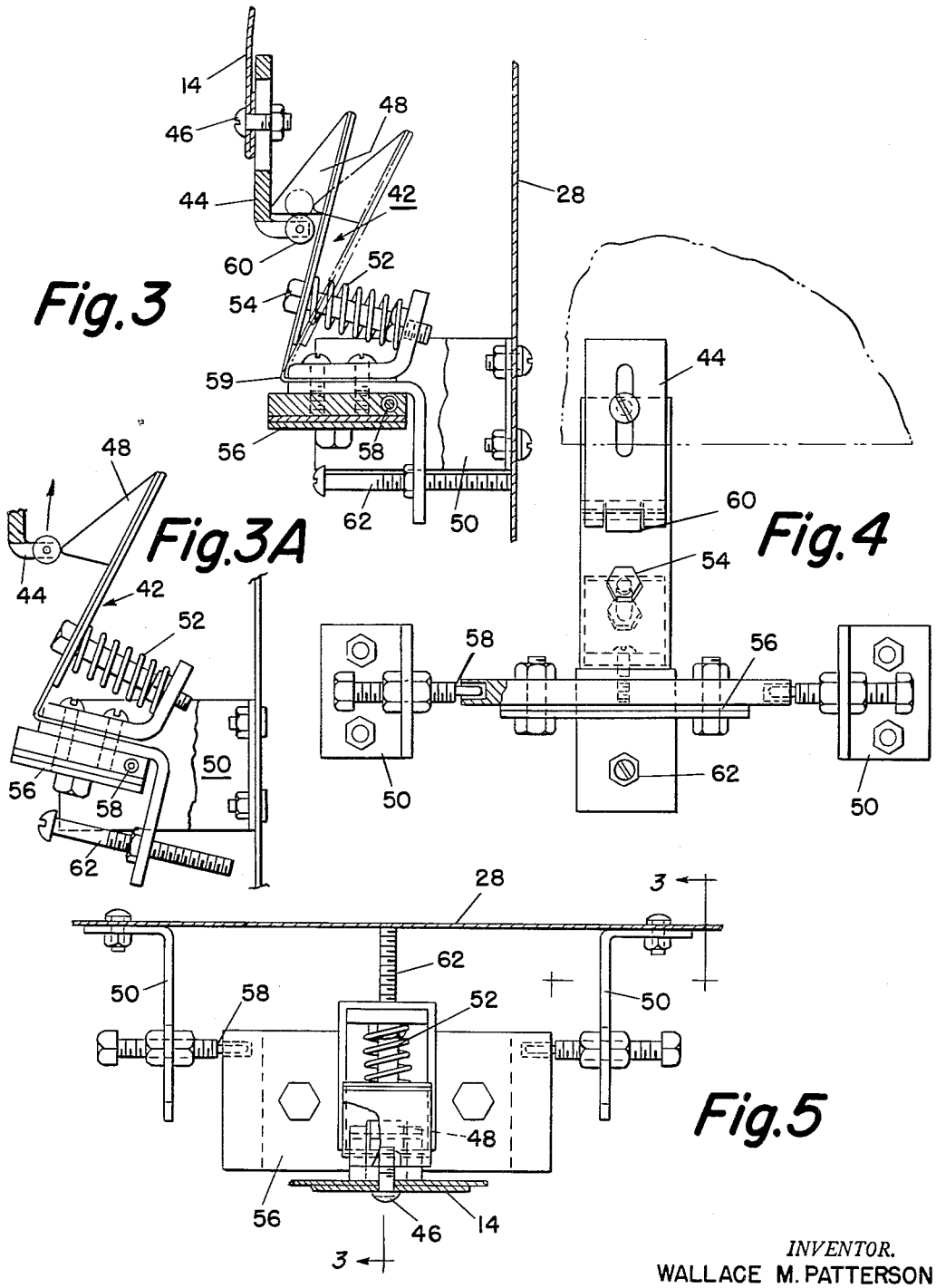

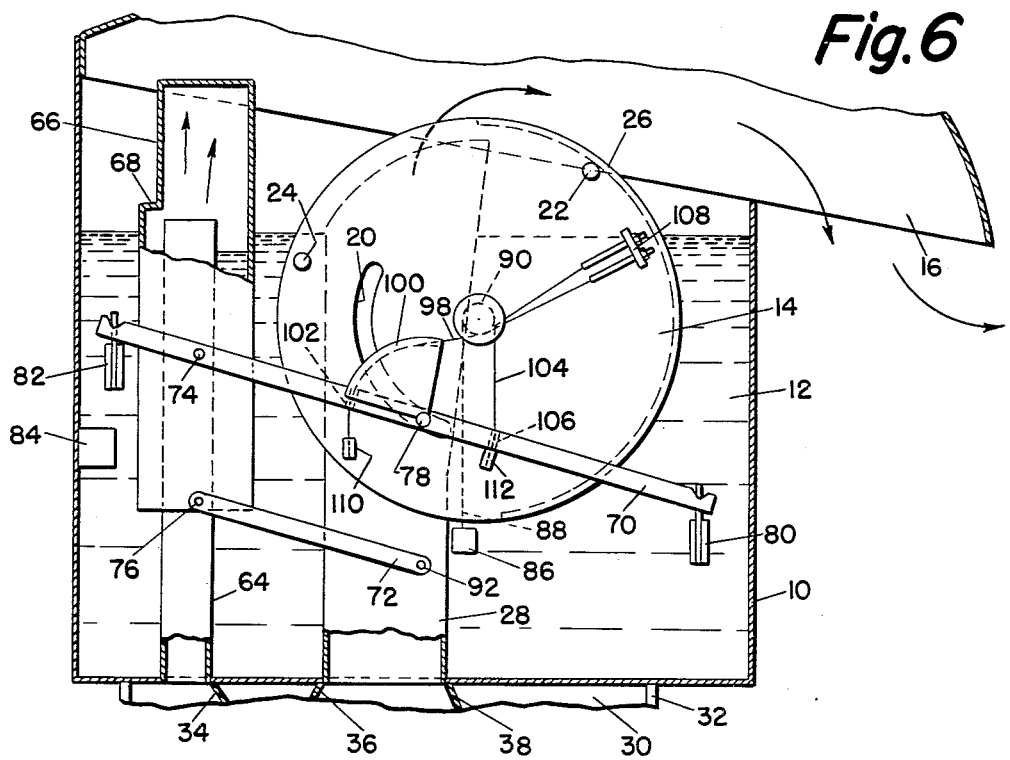
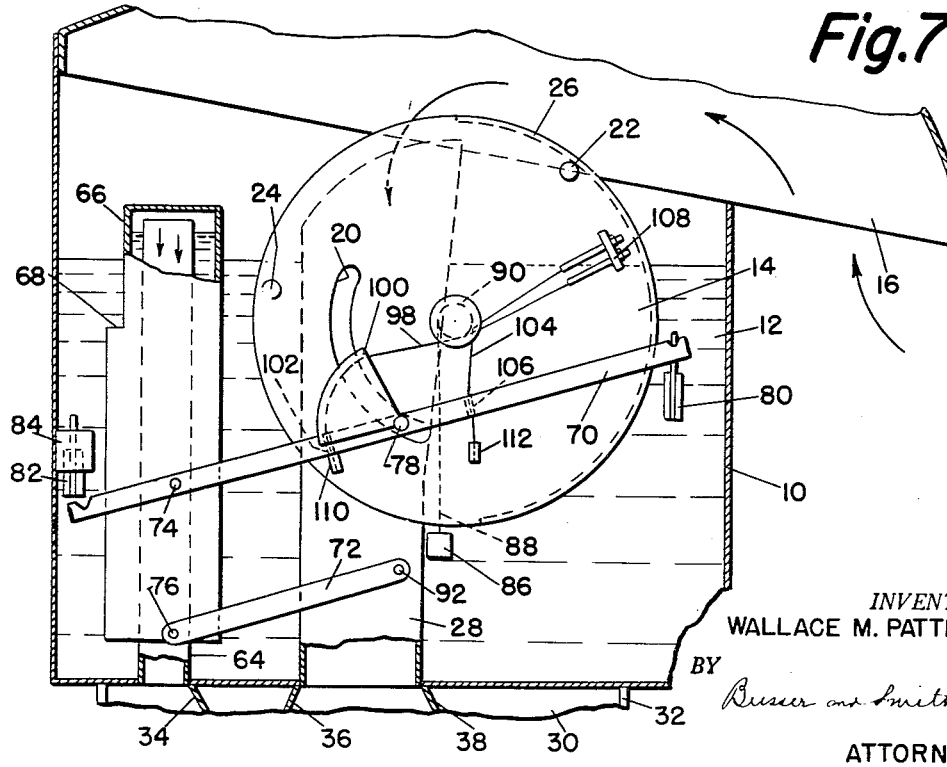

United States Patent Office 2,715,909
Patented Aug. 23, 1955

2,715,909

STORAGE TANK VENT VALVE

Wallace M. Patterson, Penn Wynne, Pa., assignor to Sellers Injector Corporation, Philadelphia, Pa., a corporation of Pennsylvania Application December 4, 1951, Serial No. 259,769

12 Claims. (Cl. 137—248)

The present invention relates to improvements in vent valves for storage tanks and more particularly to valves for sealing and venting fluid storage tanks under changing conditions of pressure and vacuum.

In the bulk storage of fluids, such as is practiced in the petroleum and chemical industries, protective measures for regulating pressures and combustion with a minimum loss of stored product are primary requirements. Liquid seal vent valves of various types have been designed which satisfy the general storage requirements. One of the types suggested, and to which the invention here disclosed is directed as an improvement, is the oscillating liquid sealed valve.

To prevent overstraining the tanks used for storage of volatile liquids such as gasoline in the petroleum industry, frequent correction of the pressures in the tanks resulting from varying temperatures and the addition to or removal from the stored liquid volume is required. The oscillated liquid sealed valve, above referred to, has been used with some success under these conditions, but is not entirely free of fault. These valves, as they are now designed, oscillate in opposite directions from the sealing position over a relief conduit depending upon whether they are relieving storage tank pressure or vacuum conditions. The maximum rotation of the inverted cup is, for mechanical reasons, restricted in both directions resulting in distortion of the gas flow as it passes through the relief conduit thus limiting the effectiveness of the valve. The relief gases are also deflected downwardly in these valves to the surface of the sealing liquid and deplete the supply very rapidly by entraining the liquid. It is an object of this invention to provide an improved form of pivoted, liquid sealed vent valve to greatly increase the efficiency of flow of the relief gases into or out of the storage tanks and to direct these gases away from the sealing liquid.

The limited relief flow permitted in the present vent valves holds the valve member open for extended periods of time. The cycling of the venting action depends upon the rate of passage of fluid through the valve under a given pressure head and the rate of change of volumes of fluids to be relieved which may be high and continuous particularly where it is caused by pumping operations. This is true notwithstanding the adaptation of fast closing devices, such as fixed and suspended weights, as they cannot effectively operate until the pressure difference has been reduced to the closing value. Venting operations such as these are particularly hazardous under fire conditions and require the extensive use of flame arresters. It is, therefore, an additional object of this invention to improve valves of this type by increasing the frequency of the cycling operation even during periods of the highest flow rates to more frequently interrupt the stream of relief gases and eliminate the requirement for flame arresters.

In practicing the invention, a housing adapted to contain a sealing liquid at operating level and to suspend an oscillatable valve member in contact therewith is mounted in communication with the vapor space of a storage tank. A communicating conduit from the tank vapor space is directed into the hollow interior of the valve member and opened therein above the sealing liquid. The valve member is positioned to cover the conduit and constructed to balance the sum of the rotational movements on it caused by fluid pressure under all variations of pressure, thereby remaining unresponsive to pressure changes. It is rotatable, however, in the same direction for relief of either a pressure or vacuum condition in the tank by a separately operated actuator positioned within the valve housing. This actuator is responsive to the same internal pressure conditions within the storage tank necessary to be relieved and is connected to the valve member by operating levers and connectors. The valve is calibrated to respond to predetermined pressure and vacuum conditions by weights attached to the lever system. The return of the pivotally supported valve member to the normal or sealing position is assured by balancing means such as additional weights attached to that member.

For a more complete understanding of the nature and scope of the invention in which the above noted objects and others will be evident, reference is made to the following detailed description read in connection with the accompanying drawing in which:

Figure 1 is an elevational view in section.

Figure 2 is a cross-section through Figure 1 along line 2—2.

Figures 3, 3A, 4 and 5 are enlarged details of the mechanically operated accelerator.

Figure 6 is a sectional elevation view of the valve relieving tank pressure.

Figure 7 is a sectional elevation view of the valve relieving tank vacuum.

It is acknowledged by those versed in the art that there are many factors contributing to and detracting from the efficient operation of valves of this type. The complete and satisfactory venting of storage tanks involves an unobstructed passage to transmit the valve controlled flow of relieving gases with a resulting minimum of turbulence. This requires the careful design of the relief conduit to meet minimum pressure loss requirements and the cooperation of the pivoted valve member in conjunction with the conduit to achieve control of the relieving gases with a minimum of turbulence and pressure loss.

According to the present invention, the advantage of an undistorted flow of relieving gases is gained by varying the cross-section of the conduit along the flow path causing the relieving gas, flowing in either direction, to be subjected to minimum pressure losses. Further, the unobstructed flow of the relieving gas through the conduit is made possible by mounting the valve member to rotate in one direction only and to move completely out of the gas flow path as it opens the conduit to relieve either pressure or vacuum conditions. The combination of these two improvements greatly increases the efficiency of the relief flow.

In addition to the unobstructed flow of the relieving gases obtained as described by properly mounting the valve member in cooperation with a relief conduit of minimum pressure losses, it is equally important to restrain the movement of the valve member to positive action under predetermined conditions. Oscillating valves of the general type, in which the pressure responsive and valving member are the same or designs wherein the actuating pressures are reduced by the flow of the relief gases, tend to "hunt" and "chatter" in an objectionable manner. Further, there must be a broad spread between the storage tank vapor pressure at which these valves begin to open and the pressure at which they reach full unthrottled flow. Unnecessary losses of volatile products occur in the range of pressures when the valve is only partially or intermittently open. These objectionable conditions occur because the known valves depend upon static pressure for opening which is decreased by the flow velocity pressure equivalent, set up in the valve as venting takes place. To relieve the valve of the "chattering" and "hunting" tendencies and to make it practical to keep the valve closed until the highest allowable pressure conditions are reached for conservation of the volatile constituents, the valve member and the actuator are divided into two separate elements, one unresponsive to storage tank pressure changes, the other unresponsive to flow of relief gases through the valve. Control over the valve member is further achieved, as already noted, by positioning and constructing it to preserve pressure balance under all conditions.

On the contrary, however, it is most important in order to preserve the storage facilities intact that the critical excess pressure, either pressure or vacum, once reached be relieved rapidly. In a device constructed as herein disclosed where the actuator and valve member are separate and uninfluenced by the normally interrupting forces, it is important that the initial operation be positive and emphatic. This is assured in the disclosed device by accelerators of both pressure and mechanical types being included as part of the structure.

Referring to the figures of the drawing, a description of the elements of the vent valve will require consideration of Figures 1 to 5 inclusive. In considering the operation of the embodiment typified by these figures, reference will be made additionally to Figures 6 and 7 where the parts are numbered in conformity with those of the detail and elements for clarity. Figures 3 through 5 show the details of the mechanical accelerator which acts as a restraining device until the predetermined operating force in the storage tank is reached.

The housing 10, indicated in all the figures as being rectangular in section, is adapted to contain a volume of sealing liquid 12 maintained at a predetermined, operating level. The elements of structure necessary to maintain the sealing liquid at the operating level are many in number and are fully understood in the art. For purposes of clarity and as they are not claimed herein, such liquid level maintaining devices are omitted from the drawings. The housing is covered as shown by a hood 16 to keep the sealing liquid from dilution by the elements. A valve member 14 is suspended by bearings 18 within the housing 10 in position to oscillate into engagement with the sealing liquid 12. The end plates of the valve member are slotted as at 20 to allow for the pivotal suspension of the lever system and afford a properly located position to affix balancing weights 22 and 24 which counteract the weight of the valve member cover plate 26 and define the phase and amount of unbalance for proper operation. The relief conduit 28, as shown as flared on the upper end, connects the pressure space with the valve member 14. The pressure space 30 is formed by flange 32 and the plates 34, 36, and 38 which directionally transmit pressures and relieving gases in the most effective manner between the storage tank 40 and the atmosphere. The conduit 28 extends above the sealing liquid surface at the flared end, into the hollow center of the valve member 14. The support bearings 18 of the valve member 14 are offset in respect to the conduit 28 to allow the valve member to completely uncover the conduit when oscillated to the venting position.

Cooperatively engaging the leading edge of the valve member 14, a mechanical accelerator 42 is used to make the venting action positive and prevent objectionable "hunting" or "chattering." As shown in the normal position of the valve in Figure 1 and the enlarged Figures 3, 3A, 4 and 5 of this detail, the accelerator 42 is positioned to contact the engager 44 attached to the valve member by the screw 46. As shown in general in Figures 1 and 2 and in detail in Figures 3 and 3A, the latch 48 is fixed to contact the engager 44 by means of a bracket 50 mounted on the relief conduit 28. The effectiveness of the latch 48 is controlled by adjusting the resilient member or spring 52 by means of the screw 54, selection of a proper weight 56 to swing the latch about the hinge point 58 and adjustment of the set screw 62. The roller 60 of the engager 44 assists in the effectiveness of this mechanical actuator by eliminating sliding friction as a factor. The operation of this mechanism will be detailed in discussing the operation of the valve member 14 in relieving excess pressure and vacuum conditions.

Above the aperture formed by the plate 34 within the body of the attaching flange 32, pressure transmitting pipe 64, in the body of the housing, projects upwardly adjacent the relief conduit 28 to a point above the established level of the sealing liquid 12. An actuating cup 66 is inverted over the pressure conductor 64 and extends downwardly into the liquid 12 to form a sealed chamber responsive to pressure changes. Since the entrance to conductor 64 is at some distance from venting conduit 28, it is not subject to the reduction of static pressure occurring in regions of high flow velocity and thus is unresponsive to relief flow through the valve. A pressure accelerator 68, as distinguished from the mechanical accelerator 42 described above, is positioned in the form of an increased area surface in the actuating cup 66 by expanding a shelf portion of the actuator perimeter at a point normally below the sealing liquid surface.

The description of the elements comprising the pressure relief valve of this invention given above is limited to the housing, the pressure and relief conductors and the major operating elements contained in the housing. The connectors linking the operating elements and the weight means to set the pressure and vacuum limits of operation will now be described in detail. The levers, cables, and other connecting elements coupling the actuating cup 66 and the valve member 14 together for operation as shown in Figure 1 are repeated on the other end of the device as indicated in Figure 2.

Referring now specifically to Figures 1 and 2, the upper or operating lever and lower or guiding lever, numbered 70 and 72 respectively, it is understood, are duplicated on each end of the valve member and act as a lever system. They are respectively connected to the actuator cup 66 at the pivotal points 74 and 76. It is noteworthy that in the illustrated device all closely mating, relatively moving surfaces and operating elements are constantly submerged in the sealing liquid. As this liquid is a low freezing, cleansing agent such as glycol, glycerine or mercury, these operating connections are kept free of ice and gums which affect the operation of valves of this type. The upper levers 70 on each end of the valve extend across the housing 10, beneath the liquid surface, and are pivotally connected to the housing by the pivot 78. A permanently effective weight 80, of selected value depending on the operating conditions, is suspended on the free ends of the levers 70 and an intermittently operable weight 82 is suspended by brackets 84 in position to engage the levers 70 during the operation of the valve. These weights 80 and 82 are effective in addition to the weights 22 and 24 shown affixed to the cylindrical valve member 14. Weight 86 is also operably connected to the valve member 14 at the axis of rotation by cable 88 passed over pulley 90. By using two weights 22 and 24, as shown, the valve member 14 is unbalanced in the desired fashion with neither weight required to enter or leave the liquid with resultant change in gravity effect. The levers 72, positioned below the levers 70, extend across the housing 10 to pivotal points 92, here shown aligned with the pivotal points 78 which in this illustration evidently form a parallelogram of levers in all positions keeping the actuator cup 66 vertical.

At the pivotal supports 18 of the valve member 14, a pair of double sheaves or pulley wheels 94 and 96 are fixedly mounted on the rotor side plates at each end of its axis. Connectors 98, such as pieces of cable or flexible wire, pass over the quadrants 100 to slidably connect to the levers 70 through apertures 102. Similar connectors 104 likewise connect to the levers 70 through apertures 106 and then are wound around the double sheaves 94 and 96 to be anchored on the valve member as shown at 108. Fastened to connectors 98 and 104, respectively, the weighted stops 110 and 112 engage the operating levers 70 as in Figure 1 when the connectors are under tension. When the connectors are not under tension, the weighted stops pull the excess connector lengths through the respective apertures in levers 70 preventing slack in the connectors from disengaging the sheaves 94 and 96 or quadrants 100.

The device as detailed is levelly mounted on the top of a storage tank 40 above the vapor space. The apertures formed by the plates 34, 36, and 38 afford pressure transfer to the vent valve and cause it to operate. It will be noted that the conduits 28 and 64 are positioned relative to the apertures formed by the plates 34, 36, and 38, respectively, to cause a smooth flow of gases between the device and the storage tank to reduce the turbulence in the interchange to a minimum. The flared top of conduit 28 and the position of the plates 36 and 38 on the lower end are chosen to expedite the movement of relieving gases in either direction. The design of this conduit is favorable to the pressure conditions as distinguished from those of vacuum as pressure forms the maximum flow requirement.

All the elements of the disclosed form of the valve have now been described and positioned relative to each other. Generally the reasons prompting the selection of the elements and their cooperation have been indicated. However, to make clear the unusual operating features of the disclosed valve, further technical details of the elements will be discussed. To make this information more understandable, the valve is considered under three conditions, namely, a normal or non-operating position, the pressure venting condition, and a vacuum relief condition. Under the first of these positions considered as the normal or non-operating condition, the selection of the various weights to establish the operating settings of the valve and the resulting advantages of this valve form will be discussed.

The valve in the normal position, when it is neither exhausting pressure nor releasing vacuum, is illustrated in the Figures 1 and 2. As the valve member 14 is shown positioned in sealing engagement with the liquid 12 in an offset position over the relief conduit 28, the device is considered in the normal closed position. This position is assumed when the differential pressures are not sufficiently excessive to move the actuator and, as explained, when the actuator is in the neutral position the valve member is constructed to remain in the normal closed position relative to the conduit 28 regardless of pressure variations. It is necessary, therefore, that any movement of the valve member be caused solely by the operation of the reciprocating movement of the actuator cup 66 and the means which connects them together. The physical weight of the valve member 14 and the balancing weights 22 and 24 are concentrated at a center of chosen relation with respect to the pivoting axis of the element. By eliminating the effect of pressures on the valve member and fixing the combined center of gravity of the weights and valve member, it is possible to regulate and control the operation within predetermined pressure limits.

The weights 80 and 82 are used to calibrate the vacuum relief and pressure exhaust operations, respectively, and to cooperate in positioning the actuator 66 in the normal position. In this normal position, illustrated by Figure 1, the weight 80 is chosen to produce a moment balancing all moments in the actuating valve and connecting systems when the selected opening vacuum pressure is reached and any incremental increase in vacuum will start movement of the actuator 66 downwardly toward the position shown in Figure 7. Weight 82 is chosen so that when the selected opening positive pressure is reached it produces a moment balancing all moments in the actuating valve and connecting systems and any incremental increase in pressure will start movement of the actuator 66 upward.

The mechanical accelerator 42 becomes effective as the valve member 14 begins movement toward the open position for either vacuum or pressure operations. Figures 3 and 3A illustrate the operating movements of the accelerator 42. The pressure accelerator 68, a structural part of the actuator 66, is brought into play as it emerges from the liquid seal. As is evident, the pressure accelerator 68 is effective for pressure relief operations only.

At all pressures between the chosen opening negative pressure and the chosen opening positive pressure, the device is stable in the closed neutral position. The only effect of changes in tank operating pressure within these limits is a change in the proportion of the amount of weight 82 carried by levers 70 and brackets 84. At selected opening vacuum pressure weight 82 is completely supported by brackets 84 and at selected opening positive pressure completely by levers 70. At all intermediate storage tank pressures, it is partially carried by both levers 70 and brackets 84.

Weight 82, partially supported by a portion of weight 80 during the normal position and released entirely to the support of bracket 84 for the vacuum relief operation, becomes effective on pressure exhaust. As stated above, a part of the force of weight 80 is balanced by the weight 82. This partial force together with the opening resistance of the valve member 14 and associated elements must be initially overcome in relieving vacuum and thus determines the vacuum setting for the device. The remainder of the force of weight 82 not counterbalanced by the weight 80 must be overcome by the actuator 66 in relieving the tank pressure. This establishes the positive pressure setting of the device. As the actuator 66 is subjected only to static pressure of the storage tank condition, there being no flow of relief gases through actuator 66 to change this pressure condition, these predetermined operating settings are effective and no chattering or hunting in this valve is possible. After the relief of the pressure condition which lifts weight 82, the weight returns the actuating cup 66 to the normal position when the pressure subsides. Tension in connector 104 is relieved and the valve member 14 returns rapidly to the normally closed position as a result of the returning moments continuously applied on it by weight 86 and the defined unbalance of weights 22 and 24.

The fixed weights 22 and 24 are made a permanent part of the valve member 14. These weights move with the valve member as it rotates to and from sealing engagement with the liquid 12 and depend for their effectiveness on the variation of the moment arm of the gravity effect relative to the pivot points 18 of the valve member axis. As the valve member 14 rotates in only one direction which will be more fully understood in the later description of operation under pressure and vacuum conditions, the weights 22 and 24 are moved above and below a horizontal line drawn to pass through the pivot point. In this way there is no change of operation due to either weight entering or leaving a medium other than that in which it starts. This is readily seen by reference to the figures showing the normal position of the valve in contrast to the operating positions illustrated in Figures 6 and 7. It will be understood, therefore, that the maximum effectiveness of these weights depending on the moment arm of the gravity effect will increase and decrease as the valve member 14 is rotated to and from the normal position and through the operating positions. Thus the unbalance of the valve member 14 is assured and the closing operation emphasized to further conserve the volatile constituents of the storage tank. Weight 86 operating on the constant radius of sheave 90 provides a constant moment in the closing direction, further assuring the closing rotation of the valve member 14 when connector tension is released by the return of the actuator 66 to its neutral position.

The system of weights both fixed and selective which when positioned as noted start the operation from and return the valve member to the neutral position is described above. The purpose of these elements will be readily understood. The advantages of subjecting neither the valve member 14 nor the actuator 66 to the same forces and limiting the response of the valve member only to the actuator movement are evidently the reasons for employing the various weights. The following details of pressure relieving operations will further emphasize the cooperation of these elements and indicate additional advantages of the invention.

The operation of the device under pressure and vacuum conditions will now be considered in which the particular elements and their relations already described will be further discussed. A pressure condition can be created in the storage tank to which the vent valve is attached in any one of several ways. Among the causes normally creating an internal pressure for which the valve is designed to operate are those caused by pumping more fluid into the tank and in the case of stored volatile liquids, an increase in temperature. Under these, and other conditions, the pressure created in the vapor space of the tank 40 is transmitted upwardly through the aperture 34 and into the conduit 64, as shown by the arrows on Figure 6. When this pressure, exerted upwardly on the inside of the sealed top of the actuating cup 66 and downwardly on the liquid surface of the sealing liquid 12, reaches a value predetermined by choice of weights 22, 24, 56, 80, 82 and 86, the actuator 66 moves upward from the position as shown in Figure 1 to the venting position shown in Figure 6. The latching device or mechanical accelerator 42 is omitted from both operational Figures 6 and 7 for clarity. As this sub combination of the device would be ineffectual in these figures as the elements are positioned and is fully explained in the opening and closing operation and also in describing Figures 3 to 5 inclusive, the omission will not detract from the description at this point in any way.

As previously described, when the pressure on the top of actuator cup 66 reaches the desired value for venting, all moments in the actuating, valve and connecting systems are in balance. Any incremental increase in pressure will cause the actuating cup to move upward with a corresponding rotation of the valve member brought about pivotal axis 18 through the connecting system. Rotation of the valve member 14 lifts engager 44 along an arcuate path of long radius. Pressure of roller 60 on the horizontal face of latch 48 rotates the whole mechanical actuator assembly 42 about pivots 58 (Figure 3A). As a result of the position chosen for latch 48 in respect to pivots 58 and 18, the nose of latch 48 soon rotates out of the path of roller 60, the resisting moment of mechanical accelerator 42 is lost and the corresponding portion of the total moment becomes available for acceleration of the opening action.

In addition to the effect of the mechanical accelerator 42, added impetus is given to the actuator 66 to overcome the natural inertia of the structure, the weights and friction of the sealing liquid, in the pressure exhaust operation by the pressure accelerator 68. Upon the admission of pressure into the sealed end of the actuating cup 66 above the liquid level, force is exerted upwardly on the inner surface of the cup top and downwardly on the liquid with the operating elements positioned as shown in the figures illustrating the normal valve position. As the liquid uncovers the lower surface of the accelerator 68, the effective area reacting to storage tank pressure is increased by the amount of that area. In the illustrated embodiment the position of accelerator 68 is placed so that its inner surface will lie approximately at the level of the fluid surface within the actuator cup 66 at the chosen operating pressure. The outer surface will then lie below the external fluid level a distance equivalent to the operating pressure measured in head of sealing liquid 12. As the pressure accelerator 68 travels through the external fluid, pressure on its upper surface is lost resulting in an increase in lifting force all of which is available for acceleration of the pressure opening operation.

Again referring to Figure 6, it will be seen that the upward movement of the actuating inverted cup 66 lifts the ends of the levers 70 and 72 where they are attached to the cup. As these levers are pivoted at other points removed from the cup, namely 78 and 92, respectively, the parts of the levers 70 through which the flexible connectors 98 and 104 act move in opposite directions. Under the pressure conditions now being discussed, it will be noted that the part of the operating lever 70 beyond the pivot 78 through which the connector 104 acts moves downwardly while the sections attached to the cup move upwardly. It is also noticeable that the balancing levers 72, being pivoted on the ends at points 76 and 92, move upwardly. This action of the levers places the connector 104 under tension and slackens the tension on the connector 98 due to the relative positions of the pivot for lever 70 and the slots receiving the connectors 98 and 104.

As has been indicated above, the connector 104 is wound around the sheave 94 and attached to the rotor at anchorage 108, which provides a preselected operating leverage for all positions the valve member 14 may take. The quadrant 100 positions the connector 98 relative to the lever 70 and the sheave 96 to prevent binding. Sufficient tension in either connector 104 or 98 then rotates the valve member in a clockwise direction, as we are viewing the operation, actuating the mechanical accelerator 42 as previously described. The upward pressure of the rolling contact 60 is resisted by the latch 48 until the predetermined point of operation is reached when the valve member 14 is suddenly released. The liquid seal is broken by the sudden rotation of the valve member to the open position which fully uncovers the conduit 28 to vent the pressure from the tank. The end plates of the valve member 14 are slotted, as noted at 20, to pass freely over the pivot 78 of the lever 70, and the cover plate 26 is positioned to engage the liquid in sealing relation over conduit 28 when the valve is in the normal position as shown in the sectional elevation of Figure 1.

It will be noted that the selection of the relative locations of the axis of rotation of the valve member 14 and the duct 28 as well as the length of arc of the rotor cover plate 26 are chosen so that the valve member 14 can be rotated in one direction completely out of the relief gas flow path. Therefore, the entire opening of the conduit 28 is uncovered by the described action which vents the pressure rapidly, the relief gas passing out freely without contacting the sealing liquid and without causing turbulence by impingement of the escaping gases against the valve member 14. The predetermined unbalance of the weight system including both fixed and movable weights causes the valve member to always rotate toward the closing direction on release of tension in the operating connector.

The chosen position of the rotor weights 22 and 24 is such that the rotor gains momentum as it closes. Roller 60 of engager 44 strikes the sloping upper surface of latch 48 with considerable force, spring 52 is compressed allowing latch 48 to rotate about flexible hinge 59 out of the path of roller 60 as indicated by the dash lined figure superimposed on Figure 3. After roller 60 has passed to a position below latch 48, spring 52 returns latch 48 to the latched position ready for the next cycle.

When in the normal closed position, the fluid under cover 26 and within actuator 66 is subject to storage tank pressure. All other fluid surfaces are subject to atmospheric pressure and any differences in pressure are balanced by a difference in the heights of the two fluid areas in the same fashion as in a monometer. The depth of engagement of the sealing edges of valve member 14 in the balanced pressure condition, when storage tank and atmospheric pressure equal, can be varied by changing the normal liquid level with respect to a horizontal plane through the axis of rotation of valve 14 or by increasing or decreasing the arc of the cover plate 26 to more or less than a half cylinder. Depending upon the least depth of engagement of either sealing edge, which are of equal depth in the illustrated form, and the selected relative areas exposed to storage tank and atmospheric area, the maximum pressure held by the valve can be varied. It is, therefore, a feature of this valve that it may be adjusted for emergency relief at varied and predetermined pressures. As has been stated previously, the valve member 14 will not respond to changes in pressure transmitted to it through the conduit 28, as it is pressure balanced in the normal or closed position. In order to operate, it must be activated by the actuator 66 through the connecting means. However, the pressure transmitted to the interior of the valve member will affect the level of the sealing liquid in the valve body. Therefore, the valve member may be adjusted to relieve more or less pressure without opening by regulating the penetration depth of the edges of the valve cover or the depth of the sealing liquid to vent pressure thereunder should the valve for any reason fail to operate.

The effectiveness of the weights 22 and 24 in the operation of the valve has been generally indicated earlier in this specification, together with the adjustable weights 80 and 82, and specifically referred to in the pressure operation above. These adjustable weights 80 and 82 are a factor in the pressure operation and must be considered in relation thereto. In the normal position of the preferred embodiment shown in Figure 1, the valve member 14 is held in the selected position by the tension of the connectors 98 and 104, by pivot 78 acting as a stop in slot 20, or partially by each, and the mechanical accelerator 42. The levers, the actuator 66 and the weight 82 are balanced in the selected relation by the position and value of the weights 80 and 82. As the pressure relieving action detailed above takes place, both the weights 80 and 82 remain effectively positioned on the operating lever 70 and the action responds to the combined operation of the fixed weights 22 and 24, the pressure of the tank transmitted to the actuator 66, the effect of the pressure accelerator 68, and the restraining effect of the mechanical accelerator 42, all of which has been described in detail.

Under the pressure relieving action as described in relation to the illustrated embodiment, the movable elements of the device start from the position in Figure 1 and assume the fully venting position shown in Figure 6. The force of the pressure actuator 66 urges the valve member 14 against the restraining influence of the accelerator 42 until released when valve member 14 rotates and the weight 82 is lifted which is partially balanced by weight 80. After the pressure is vented through the completely uncovered relief conduit 28 and out the covering hood 16 to atmosphere, the actuator 66 is no longer supported in the raised position. The decrease in pressure permits the difference in weight and position between weights 80 and 82 and the actuator 66 together with the unstable position of weights 22, 24 and 86 directly affecting valve member 14 to be asserted. The valve member 14 returns to the normal position as does the actuator 66. The spread between the opening and closing pressures is a function of the selection of the relative areas of the actuator 66, the pressure accelerator 68, the selected unbalance of the weight system and the restraining effect of the mechanical accelerator 42.

Attention is directed to Figures 3 and 3A for further consideration of the operating features of the mechanical accelerator 42. The normal engaged position of the latch 48 and engager 44 is shown in Figure 3 in heavy lines. The oscillating movement of the valve member 14, clockwise for either relief operation, lifts the engager upwardly pressing the roller bearing 60 against the latch. A rotary movement is transmitted to the latch about the pivot 58 against the downward pull of the weight 56. In Figure 3A the position of the latch member at point of release is shown.

In the closing movement shown by the dash lines superimposed on Figure 3, the latch 48 moves back to receive the engager 44 against the resilient member 52. A point of flexure 59 in the shim stock which is used to support the latch facilitates this movement. Thus two separate adjustments are made available for better operation. To control the opening resistance, the weight 56 is selectable; while the resistance to relatching may be varied by changing the engaging slope between the latch and the engager bearing 60, together with, or separately, correcting the tension of spring 52.

It remains to consider the operation of the illustrated embodiment of the valve in response to a vacuum condition for which reference is made to Figures 1 and 7 for comparison. The former of these two figures shows the device in the normal or closed position and the latter in the position to which the elements are moved in relieving a vacuum condition. The first noticeable effect from a study of these two figures is the fact that the valve member 14 rotates in the same direction to relieve vacuum as it did to relieve pressure (Figure 6). The vacuum condition existing in the storage tank transmits a negative pressure to the interior of the valve member 14 and also to the actuator 66. As the valve member is pressure balanced, the vacuum condition existing therein has no other effect than to raise the liquid level under the valve member 14. In the actuator 66, however, the negative pressure indicated by arrows in Figure 7 is effective internally thereof above the liquid surface. The pressure accelerator 68 being below the liquid surface remains submerged throughout the vacuum relief operation and does not affect the operation. Immediately before the relief position of the elements as shown in Figure 7 is assumed, the position of these elements is as shown in Figure 1, which must be considered first.

In the balanced position of Figure 1, the negative pressure exerted on the actuator 66 tends to move it downwardly in response to atmospheric pressure outside it and the liquid level moves upwardly therein. The force tending to move the actuator downwardly is transmitted through the operating lever 70 tensing cable connector 98 and relaxing cable 104. The mechanical accelerator 42 is latched and remains so until the predetermined force reaches the releasing point as previously described for the pressure venting operation.

Now considering the position of the elements in Figure 7 to which they move on the sudden release of the mechanical accelerator due to the negative pressure of the vaccum, the device is shown in the full relieving position. The downward movement of the actuator 66 moves the levers 70 and 72 downward at the connection pivots joining them with the actuator. The opposite end of lever 70 is lifted about the pivot 78 which keeps the weight 80 effective, but releases weight 82 to the suspending bracket 84, and slackens the tension in the connector 104. The lever 72 moves downwardly parallel to the lever 70 and keeps the actuator vertical while exerting a pull on the connector 98 as it is guided by the quadrant 100. The valve member 14 rotates to the open position to relieve the vacuum condition. When the vacuum is relieved to the extent that the actuator is no longer held in the downward position by the difference between atmospheric and vacuum pressures, the elements are returned to their normal position by the effect of the weight 80 in cooperation with the unbalanced weight system already described.

Should the valve member 14 fail to operate through breakage or other reason, the valve will still operate as a safety device for the vacuum condition, as already described for the pressure relief. It has been described above that the vacuum condition has no effect on the valve member 14 prior to activation by the actuator 66 than to raise the level of the sealing liquid under the valve member 14. The sealing edge of the valve member 14 is positioned at a depth below the liquid surface so that air will be admitted thereunder before the vacuum will raise the liquid to spill into conduit 28. In this way, the vacuum will be relieved under negative pressure conditions in excess of those required to operate the valve, but still within safety limits.

There are numerous advantages in the disclosed structure which will be immediately evident to those versed in the art. The use of an actuating element separate from the valve member, not responsive to pressure changes, permits more positive and better controlled action than is possible where the valve member is the sole responsive device. In this instance, rotation of the valve member in one direction only for either the relief of pressure or vacuum and thus completely out of the flow path of the relieving conduit, corrects the poor flow characteristics of the earlier devices and results in more rapid and complete relief action. In addition, the flowing relief gases are never directed at or across the sealing liquid allowing higher practical flow velocities with little or no fluid entrainment. A briefer cycling period results, reducing time periods when flame could be transmitted on the gas stream back into the tank to an absolute minimum, thus eliminating any practical requirement for flame arresters.

The construction and operation disclosed herein illustrate an operating embodiment of the device. It is intended that the details described herein be not regarded as limitations upon the scope of the invention, except insofar as they are defined in the accompanying claims.

I claim:

1. A breathing device for a liquid storage tank comprising in combination, a vented housing adapted to retain a liquid at a normal operating level therein, a semi-cylindrical valve member pivotally mounted in said housing in operating contact with the liquid, a relief conduit extending through the housing and the liquid and opening into the valve member above the liquid level, an inverted cup actuator in said housing in sealing engagement with the liquid and spaced from the valve member, a pressure transmitting pipe extending through the housing and the liquid and opening into the inverted actuator cup above the liquid level, lever means pivotally suspending the inverted cup actuator in said housing in operating position with the valve member, weight means arranged to cooperate with said levers, connecting means linking the lever means to the valve member to oscillate said member in response to the movement of the actuator, and means to restrain the oscillatory movement of said valve member until the excess pressure exceeds a predetermined value.

2. A device as set forth in claim 1 further characterized in that said inverted actuator cup is flanged to increase the effective area thereof, said flange being longitudinally positioned for immersion in the sealing liquid during the normal and vacuum relief operations, and to lift above the surface of the liquid during the excess pressure release operation.

3. A breathing device for a liquid storage tank comprising in combination, a vented housing adapted to retain a liquid at a normal operating level therein, a semi-cylindrical valve member pivotally mounted in said housing in operating contact with the liquid, a relief conduit extending through the housing and the liquid and opening into the valve member above the liquid level, an inverted cup actuator in said housing in sealing engagement with the liquid and spaced from the valve member, a pressure transmitting pipe extending through the housing and the liquid and opening into the inverted actuator cup above the liquid level, lever means pivotally suspending the inverted cup actuator in said housing in operating position with the valve member, said means including an operating lever and a balancing lever relatively positioned to maintain the actuator in pressure responsive position, weight means arranged to cooperate with said operating lever, connecting means linking the lever means to the valve member to oscillate said member in response to the movement of the actuator, and means to restrain the oscillatory movement of said valve member until the excess pressure exceeds a predetermined value.

4. A device as set forth in claim 3 further characterized in that the weight means arranged to cooperate with said levers includes a constantly effective weight engaging the operating lever, and an intermittently effective weight positioned to engage said operating lever only during the pressure relief operation.

5. A breathing device for a liquid storage tank comprising in combination, a vented housing adapted to retain a liquid at a normal operating level therein, a semi-cylindrical valve member pivotally mounted in said housing in operating contact with the liquid, a relief conduit extending through the housing and the liquid and opening into the valve member above the liquid level, an inverted cup actuator in said housing in sealing engagement with the liquid and spaced from the valve member, a pressure transmitting pipe extending through the housing and the liquid and opening into the inverted actuator cup above the liquid level, lever means pivotally suspending the inverted cup actuator in said housing in operating position with the valve member, said means including an operating lever pivotally attached to the actuator and pivotally suspended at the operating fulcrum adjacent the valve member and a balancing lever relatively positioned to maintain the actuator in pressure responsive position, connecting means linking the lever means to the valve member to oscillate said member in response to the movement of the actuator, and means to restrain the oscillatory movement of said valve member until the excess pressure exceeds a predetermined value.

6. A device as set forth in claim 5 further characterized in that the connecting means linking the lever means to the valve member includes a rotor sheave fixed to the valve member at the point of pivotal suspension, two flexible cables separately secured to the operating lever at points spaced on each side of the operating fulcrum and gripping said rotor sheave in operating engagement.

7. A device as set forth in claim 5 further characterized in that said means to restrain the oscillatory movement of the valve member for positive pressure operation includes a catch mounted in the housing and an engager fixed to said valve member in position to engage the latch in the neutral position.

8. A breathing device for a liquid storage tank comprising a vented housing adapted to retain a sealing liquid at operating level, a hollow oscillatory valve member pivotally suspended in said housing in sealing contact with the liquid, a pressure relief conduit extending through said housing into the hollow valve member above the liquid level, a reciprocable inverted cup actuator positioned in said housing adjacent the valve member and in sealing engagement with the liquid, a pressure transmitting pipe extending through the housing to open into the actuator cup above the liquid level, an operating lever arm connecting the actuator and valve member for pressure responsive cooperation, and response accentuating means adapted to mechanically restrain the oscillation of said valve member until a predetermined excess pressure is established.

9. A breathing device for a liquid storage tank comprising a vented housing adapted to retain a body of sealing liquid at a predetermined level, a hollow semi-cylindrical valve member pivotally supported in said housing to oscillate about its longitudinal axis in sealing relation with said liquid, a pressure relief conduit extending into said housing and opening into the hollow valve member above the liquid level, an inverted cup actuator in said housing in sealing engagement with the liquid and spaced from the valve member, a pressure transmitting pipe extending through the housing and the liquid and opening into the inverted actuator cup above the liquid level, lever means pivotally suspending the inverted cup actuator in said housing in operating position with the valve member, and connecting means linking the lever means to the valve member to oscillate said valve member in response to the movement of the inverted cup actautor.

10. The breathing device defined in claim 9 further characterized in that the lever means pivotally suspending the inverted cup actuator in operating position with the valve includes an operating lever pivotally attached to the actuator and pivotally suspended at the operating fulcrum adjacent the valve member, and a balancing lever relatively positioned to maintain the actuator in pressure responsive position.

11. The breathing device defined in claim 9 further characterized in that the connecting means linking the lever means to the valve member to oscillate said valve member includes a rotor sheave fixed to the valve member at the point of pivotal suspension, two flexible cables separately secured to the operating lever at points spaced on each side of the operating fulcrum and gripping said rotor sheave in operating engagement.

12. A breathing device for a liquid storage tank comprising a vented housing adapted to retain a body of sealing liquid at a predetermined level, a hollow semi-cylindrical valve member pivotally supported in said housing to oscillate about its longitudinal axis in sealing relation with said liquid, a pressure relief conduit extending into said housing and opening into the hollow valve member above the liquid level, an inverted cup actuator in said housing in sealing engagement with the liquid and spaced from the valve member, a pressure transmitting pipe extending through the housing and the liquid and opening into the inverted cup actuator above the liquid level, an operating lever pivotally attached to the actuator and pivotally suspended at the operating fulcrum adjacent the valve member, a balancing lever relatively positioned to maintain the actuator in the pressure responsive position, a rotor sheave fixed to the valve member at the point of pivotal suspension, and two flexible cables separately secured to the operating lever at points spaced on each side of the operating fulcrum and gripping said rotor sheave in operating engagement.

References Cited in the file of this patent

UNITED STATES PATENTS

| | | |
|---|---|---|
| 1,700,362 | Atwell | Jan. 29, 1929 |
| 1,747,810 | Atwell | Feb. 18, 1930 |
| 1,796,010 | Eakins | Mar. 10, 1931 |
| 2,060,256 | Smith | Nov. 10, 1936 |
| 2,329,182 | Boynton | Sept. 14, 1943 |
| 2,579,218 | Van Deventer | Dec. 18, 1948 |